United States Patent
Izadi-Zamanabadi

(10) Patent No.: US 10,663,200 B2
(45) Date of Patent: May 26, 2020

(54) METHOD FOR CONTROLLING A SUPPLY OF REFRIGERANT TO AN EVAPORATOR IN CONTINGENCY MODE

(71) Applicant: Danfoss A/S, Nordborg (DK)

(72) Inventor: Roozbeh Izadi-Zamanabadi, Sonderborg (DK)

(73) Assignee: DANFOSS A/S, Nordborg (DK)

(*) Notice: Subject to any disclaimer, the term of this patent is extended or adjusted under 35 U.S.C. 154(b) by 49 days.

(21) Appl. No.: 16/068,925

(22) PCT Filed: Jan. 10, 2017

(86) PCT No.: PCT/EP2017/050397
§ 371 (c)(1),
(2) Date: Jul. 10, 2018

(87) PCT Pub. No.: WO2017/121721
PCT Pub. Date: Jul. 20, 2017

(65) Prior Publication Data
US 2019/0011156 A1   Jan. 10, 2019

(30) Foreign Application Priority Data
Jan. 13, 2016  (DK) .................................. 2016 00017

(51) Int. Cl.
*F25B 49/02* (2006.01)
*F25B 41/06* (2006.01)
(Continued)

(52) U.S. Cl.
CPC ............ *F25B 41/062* (2013.01); *F24F 11/32* (2018.01); *F25B 49/005* (2013.01); *F25B 49/02* (2013.01);
(Continued)

(58) Field of Classification Search
CPC . F24F 11/32; F24F 11/38; F25B 41/02; F25B 49/005; F25B 49/02; F25B 2500/19;
(Continued)

(56) References Cited

U.S. PATENT DOCUMENTS 5,115,643 A * 5/1992 Hayata .................... F25B 13/00
62/115
5,440,895 A * 8/1995 Bahel .................... F25B 41/062
62/223

(Continued)

FOREIGN PATENT DOCUMENTS

EP         2894421 A1    7/2015

OTHER PUBLICATIONS

International Search Report for PCT Serial No. PCT/EP2017/050397 dated Apr. 7, 2017.

*Primary Examiner* — Jonathan Bradford
(74) *Attorney, Agent, or Firm* — McCormick, Paulding & Huber PLLC

(57) ABSTRACT

A method for controlling a supply of refrigerant to an evaporator of a vapour compression system, such as a refrigeration system, an air condition system or a heat pump. During normal operation, the opening degree of the expansion valve is controlled on the basis of an air temperature, $T_{air}$, of air flowing across the evaporator and/or on the basis of superheat of refrigerant leaving the evaporator. If at least one sensor used for obtaining $T_{air}$ or the superheat is malfunctioning, operation of the vapour compression system is switched to a contingency mode. A reference temperature, $T_{out, ref}$, is calculated, based on previously obtained values of a temperature, $T_{out}$, of refrigerant leaving the evaporator, during a predefined previous time interval, and subsequently the opening degree of the expansion valve is controlled on (Continued)

the basis of the obtained temperature, $T_{out}$, in order to reach the calculated reference temperature, $T_{out,\,ref}$.

16 Claims, 5 Drawing Sheets

(51) Int. Cl.
  *F25B 49/00* (2006.01)
  *F24F 11/32* (2018.01)
(52) U.S. Cl.
  CPC ....... *F25B 2500/19* (2013.01); *F25B 2500/28* (2013.01); *F25B 2600/21* (2013.01); *F25B 2600/23* (2013.01); *F25B 2600/2513* (2013.01); *F25B 2700/2103* (2013.01); *F25B 2700/2106* (2013.01); *F25B 2700/21175* (2013.01)
(58) Field of Classification Search
  CPC .............. F25B 2500/28; F25B 2600/21; F25B 2600/23; F25B 2600/2513; F25B 2700/2103; F25B 2700/2106; F25B 2700/21175
  See application file for complete search history.

(56) References Cited

U.S. PATENT DOCUMENTS

| | | | |
|---|---|---|---|
| 5,582,021 A * | 12/1996 | Masauji | B60H 1/00735 236/91 R |
| 6,877,328 B2 * | 4/2005 | Bair, III | F25B 49/022 62/126 |
| 9,103,557 B2 * | 8/2015 | Choi | F25B 41/062 |
| 2006/0213208 A1 | 9/2006 | Iwaki et al. | |
| 2007/0256432 A1 * | 11/2007 | Zugibe | F25B 43/02 62/115 |
| 2013/0205815 A1 | 8/2013 | Izadi-Zamanabadi et al. | |
| 2015/0219506 A1 | 8/2015 | Izadi-Zamanabadi et al. | |

* cited by examiner

METHOD FOR CONTROLLING A SUPPLY OF REFRIGERANT TO AN EVAPORATOR IN CONTINGENCY MODE

CROSS-REFERENCE TO RELATED APPLICATIONS

This application is a National Stage application of International Patent Application No. PCT/EP2017/050397, filed on Jan. 10, 2017, which claims priority to Danish Patent Application No. PA201600017, filed on Jan. 13, 2016, each of which is hereby incorporated by reference in its entirety.

TECHNICAL FIELD

The present invention relates to a method for controlling a supply of refrigerant to an evaporator, in particular to an evaporator which forms part of a vapour compression system, such as a refrigeration system, an air condition system or a heat pump. According to the invention, the supply of refrigerant to the evaporator is controlled in a contingency mode, i.e. under circumstances in which one or more sensors, which are used for control of the supply of refrigerant during normal operation, is/are unavailable or unreliable.

BACKGROUND

Vapour compression systems, such as refrigeration systems, air condition systems or heat pumps, normally comprise at least one compressor, at least one condenser, at least one expansion device, e.g. in the form of expansion valves, and at least one evaporator arranged along a refrigerant path. Refrigerant circulates the refrigerant path and is alternatingly expanded and compressed, and heat exchange takes place in the condensers and the evaporators. Expanded refrigerant enters the evaporators in a mixed state of gaseous and liquid refrigerant. As the refrigerant passes through the evaporators, it evaporates while exchanging heat with a secondary fluid flow, such as an air flow, across the evaporator. In order to utilise the potential refrigeration capacity of a given evaporator to a maximum extent, it is desirable that liquid refrigerant is present along the entire length of the evaporator. On the other hand, it is undesirable that liquid refrigerant passes through the evaporator and into the suction line, since it may cause damage to the compressors if liquid refrigerant reaches the compressors. It is therefore desirable to control the supply of refrigerant to the evaporators in such a manner that, in a given evaporator, the boundary between mixed phase refrigerant and gaseous refrigerant is exactly at the outlet of the evaporator. This is often done by controlling an opening degree of the expansion device, based on one or more measured parameters.

EP 2 894 421 A1 discloses a method for controlling a supply of refrigerant to an evaporator on the basis of measurements provided by two temperature sensors. The opening degree of the expansion valve is set to a calculated opening degree, based on an air temperature of a secondary air flow across the evaporator, overlaid with a perturbation signal. The temperature of refrigerant leaving the evaporator is monitored and the temperature signal is analysed. If the analysis reveals that a dry zone in the evaporator approaches a minimum length, the opening degree of the expansion valve is decreased. This provides a safety mechanism which ensures that liquid refrigerant is prevented from passing through the evaporator. EP 2 894 421 A1 only describes control of the vapour compression system during normal operation, and is not concerned with how the vapour compression is controlled in a contingency mode, i.e. in the case that one or more of the temperature sensors is unavailable or unreliable.

In some prior art methods, an average opening degree of the expansion valve, e.g. during an immediately previous time interval, is calculated in the case that it is established that a temperature sensor, which is normally used for controlling the opening degree of the expansion valve, is unavailable or unreliable. The opening degree of the expansion valve is then set to a reduced opening degree, being an appropriate percentage, e.g. 80%, of the calculated average opening degree. The opening degree of the expansion valve is then maintained at this reduced opening degree until the unavailable or unreliable sensor has been repaired or replaced. This allows the vapour compression system to continue operation, despite the unavailable or unreliable sensor, and the reduced opening degree provides a safety margin which prevents liquid refrigerant from passing through the evaporator. However, the vapour compression system is not operated in an efficient manner, and it is not possible to take possible changes in the refrigeration load, e.g. due to new goods being added to a display case of the vapour compression system, into account.

SUMMARY

It is an object of embodiments of the invention to provide a method for controlling a supply of refrigerant to an evaporator of a vapour compression system in a contingency mode, in an energy efficient manner.

It is a further object of embodiments of the invention to provide a method for controlling a supply of refrigerant to an evaporator of a vapour compression system in a contingency mode, in a manner which allows changes in the refrigeration load to be taken into account.

The invention provides a method for controlling a supply of refrigerant to an evaporator of a vapour compression system, the vapour compression system comprising at least one evaporator, at least one compressor, at least one condenser and at least one expansion valve arranged in a refrigerant circuit, the method comprising the steps of:

obtaining a temperature, $T_{out}$, of refrigerant leaving the evaporator, obtaining a control parameter value relating to the vapour compression system, controlling an opening degree of the expansion valve, on the basis of the obtained control parameter, and in order to reach a reference value for the control parameter, detecting that at least one sensor used for obtaining the control parameter is malfunctioning, calculating a reference temperature, $T_{out,\ ref}$, based on previously obtained values of the temperature, $T_{out}$, during a predefined previous time interval, and subsequently controlling the opening degree of the expansion valve, on the basis of the obtained temperature, $T_{out}$, and in order to reach the calculated reference temperature, $T_{out,\ ref}$, of the refrigerant leaving the evaporator.

In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises at least one evaporator, at least one compressor, at least one condenser, and at least one expansion valve. Thus, the vapour compression system may comprise only one of each of these components, or the vapour compression system may comprise two or more of any of these components. For instance, the vapour compression system may comprise a single compressor, or it may comprise two or more compressors, e.g. arranged in a compressor rack. Similarly, the vapour compression system may comprise only one evaporator, or it may comprise two or more evaporators. In the latter case each evaporator may be arranged to provide refrigeration for a separate refrigerated volume. The separated refrigerated volumes may, e.g., be separate display cases of a supermarket. In any event, each evaporator is preferably connected to a separate expansion valve which controls the supply of refrigerant to that evaporator, independently of the refrigerant supply to the other evaporators. Furthermore, an evaporator unit may comprise a single section, or two or more sections which may be connected in series or in parallel.

The method according to the invention is related to control of the supply of refrigerant to a single evaporator, via the corresponding expansion valve. However, this evaporator may very well be arranged in a vapour compression system comprising one or more additional evaporators, in which case the supply of refrigerant to these additional evaporators is controlled separately.

According to the method of the invention, a temperature, $T_{out}$, of refrigerant leaving the evaporator, and a control parameter value, e.g. a temperature, $T_{air}$, of air flowing across the evaporator, are initially obtained. The temperature, $T_{out}$, of refrigerant leaving the evaporator may, e.g., be measured by means of one or more temperature sensors arranged in the refrigerant path immediately after the evaporator, or on an exterior part of a refrigerant pipe in this region. $T_{out}$ represents the superheat of the refrigerant leaving the evaporator, at least indirectly. The temperature, $T_{air}$, of air flowing across the evaporator may, e.g., be measured by means of one or more temperature sensors arranged in an air passage across the evaporator. Another suitable control parameter could be the superheat of refrigerant leaving the evaporator, in which case the pressure of refrigerant leaving the evaporator or the temperature of refrigerant entering the evaporator could be measured. The temperature, $T_{air}$, could, e.g., be the temperature of air flowing towards the evaporator, the temperature of air flowing away from the evaporator, or a weighted value of the temperature of air flowing towards the evaporator and the temperature of air flowing away from the evaporator. In any event, $T_{air}$ represents a temperature prevailing in a refrigerated volume arranged near the evaporator. Accordingly, $T_{air}$ reflects a refrigeration need of the refrigerated volume.

Next, an opening degree of the expansion valve is controlled, on the basis of the obtained control parameter, e.g. the obtained air temperature, $T_{air}$, and in order to reach a reference value for the control parameter, e.g. a reference air temperature, $T_{air,ref}$ of the air flowing across the evaporator. Accordingly, during normal operation, the measurements performed by the sensor(s) used for obtaining the control parameter, e.g. the air temperature, $T_{air}$, are used for controlling the opening degree of the expansion device, and thereby the supply of refrigerant to the evaporator, and the opening degree of the expansion device is controlled in order to obtain a desired value for the control parameter, e.g. the air temperature inside the refrigerated volume. Thus, the opening degree of the expansion valve is, e.g., controlled in order to meet a certain refrigeration need of the refrigerated volume.

However, in the case that at least one sensor used for obtaining the control parameter, e.g. the air temperature, $T_{air}$, is malfunctioning, e.g. in the case that the sensor(s) is/are unavailable or unreliable, it is no longer possible to control the opening degree of the expansion valve, and thereby the supply of refrigerant to the evaporator, in the manner described above. Instead, it is necessary to operate the vapour compression system in a contingency mode.

Thus, according to the method of the invention, it is detected that at least one sensor used for obtaining the control parameter, e.g. the air temperature, $T_{air}$, is malfunctioning. When this has been established, contingency mode operation of the vapour compression system is initiated as described below.

A reference temperature, $T_{out,ref}$ is calculated, based on previously obtained values of the temperature, $T_{out}$, during a predefined previous time interval. The predefined previous time interval may advantageously be a time period expiring immediately before it was detected that the sensor(s) is/are malfunctioning, for instance the last 2 hours or 4 hours of normal operation of the vapour compression system, prior to the malfunction of the air temperature sensor(s). Accordingly, the calculated reference temperature, $T_{out,ref}$ reflects the actual values of the temperature, $T_{out}$, of refrigerant leaving the evaporator, during normal operation of the vapour compression system.

In centralised refrigeration systems, where the suction pressure, i.e. the pressure prevailing in the suction line interconnecting the outlet of the evaporator and the inlet of the compressor rack, is controlled by a compressor rack controller, it can be assumed that the suction pressure is kept substantially constant, at least on a short timescale. The superheat, SH, of refrigerant leaving the evaporator is given as:

$$SH=T_{out}-T_e,$$

where $T_e$ is the bubble temperature or dew point of the refrigerant leaving the evaporator. Accordingly, the superheat, SH, is the difference between the dew point of the refrigerant, under the given circumstances, and the actual temperature of the refrigerant leaving the evaporator. The dew point, $T_e$, depends, among other things, on the pressure of the refrigerant leaving the evaporator, i.e. on the suction pressure. If the suction pressure is substantially constant, then it can also be assumed that the dew point, $T_e$, is substantially constant. If it is further assumed that the vapour compression system operates in a steady state, then it can also be assumed that the superheat, SH, is kept substantially constant. Accordingly, under these circumstances $T_{out}$ is also substantially constant. Therefore, if the vapour compression system is operated in such a manner that a value of $T_{out}$ is obtained, which is substantially equal to, or of the same order as, measured values of $T_{out}$ obtained during normal operation, it can be assumed that the vapour compression system is operated more or less as efficiently as it was during normal operation.

Therefore, according to the method of the invention, the opening degree of the expansion valve is subsequently controlled on the basis of the obtained temperature, $T_{out}$, and in order to reach the calculated reference temperature, $T_{out,ref}$ of the refrigerant leaving the evaporator.

This allows the vapour compression system to continue operating, despite the malfunctioning temperature sensor(s), in an efficient manner, and without risking that liquid refrigerant passes through the evaporator and into the suction line. Furthermore, since the opening degree of the expansion valve is actually controlled, based on temperature measurements performed during operation of the vapour compression system, it is possible to react to changes occurring in the refrigeration load, e.g. due to new products being positioned in a display case. This is a great advantage as compared to the prior art method in which the opening degree of the expansion valve is kept at a fixed level until the malfunctioning temperature sensor(s) has/have been replaced or repaired.

In summary, the method of the invention allows the vapour compression system to be operated in a contingency mode, in which the vapour compression system is operated more efficiently than is the case in prior art methods, and in such a manner that changes in refrigeration load can be taken into account and reacted on.

As mentioned above, the step of controlling a control parameter value may comprise obtaining a temperature, $T_{air}$, of air flowing across the evaporator; the step of controlling an opening degree may comprise controlling the opening degree of the expansion valve, on the basis of the obtained air temperature, $T_{air}$, and in order to reach a reference air temperature, $T_{air, ref}$, of the air flowing across the evaporator; and the step of detecting that at least one sensor is malfunctioning may comprise detecting that at least one sensor used for obtaining the air temperature, $T_{air}$, is malfunctioning.

The step of calculating a reference temperature, $T_{out, ref}$, may comprise calculating an average value of obtained values of the temperature, $T_{out}$, of refrigerant leaving the evaporator during the predefined previous time interval. In this case the reference temperature, $T_{out, ref}$, which is applied when the temperature sensor(s) used for measuring $T_{air}$ is/are malfunctioning, and the vapour compression system is therefore operated in a contingency mode, reflects an average temperature level of refrigerant leaving the evaporator during normal operation. The average value may be a mathematical average value, or it may be a suitable weighted average of the measured values.

As an alternative, the reference temperature, $T_{out, ref}$, may be calculated or derived from the previously obtained values of $T_{out}$ in any other suitable manner.

The step of subsequently controlling the opening degree of the expansion valve may comprise the steps of:
   providing a perturbation signal, and setting the opening degree of the expansion valve to the controlled opening degree, overlaid with the perturbation signal,
   monitoring the temperature, $T_{out}$, of refrigerant leaving the evaporator,
   analysing a signal representing the monitored temperature, $T_{out}$, and
   increasing the opening degree of the expansion valve in the case that said analysis reveals that $T_{out} > T_{out, ref}$.

According to this embodiment, the opening degree of the expansion valve fluctuates around a mean value, which represents the controlled opening degree, i.e. the opening degree which is dictated by the comparison between the measured temperature, $T_{out}$, and the reference temperature, $T_{out, ref}$. The fluctuations are determined by the perturbation signal, and may, e.g., be sinusoidal, of a relay type, or of any other suitable type. In the present context the term 'perturbation signal' should be interpreted to mean a signal which varies on a timescale which is significantly shorter than the timescale on which the controlled opening degree of the expansion valve varies.

Then the temperature, $T_{out}$, of refrigerant leaving the evaporator is monitored, and a signal representing the monitored temperature, $T_{out}$, is analysed. Finally, the opening degree of the expansion valve is increased in the case that the analysis reveals that $T_{out}$ becomes larger than $T_{out, ref}$.

As an alternative to the control method described above, a discrete-time based approach may be applied, e.g. using a classical proportional integral (PI) controller.

The step of controlling the opening degree of the expansion valve, on the basis of the obtained temperature, $T_{out}$, and in order to reach the calculated reference temperature, $T_{out, ref}$, of the refrigerant leaving the evaporator may be continued until the malfunctioning sensor(s) has/have been replaced or repaired.

According to this embodiment, the vapour compression system continues operating in the contingency mode as long as the malfunctioning sensor(s) remain(s) malfunctioning. However, as soon as the malfunctioning sensor(s) has/have been replaced or repaired, and reliable measurements of the air temperature, $T_{air}$, are therefore once again available, operation of the vapour compression system is switched back to a normal mode.

The step of calculating a reference temperature, $T_{out, ref}$, may comprise calculating a first reference temperature, $T_{out, ref, day}$, based on values of $T_{out}$ obtained during daytime, and calculating a second reference temperature, $T_{out, ref, night}$, based on values of $T_{out}$ obtained during nighttime.

Some vapour compression systems, such as supermarket refrigeration systems, operate differently during the day and during the night. For instance, during nighttime, night covers may be arranged over the display cases, and products are most likely not removed from or positioned in the display cases. Therefore, during nighttime the energy consumption of the vapour compression system is lower than during daytime, and the refrigeration load is substantially constant. On the other hand, during daytime the display cases may be open all the time, or doors may be repeatedly opened by customers. Furthermore, products are most likely repeatedly removed from or positioned in the display cases, thereby changing the refrigeration load. It may therefore be relevant to obtain a reference temperature, $T_{out, ref, day}$, which represents normal operation of the vapour compression system during daytime, as well as a reference temperature, $T_{out, ref, night}$, which represents normal operation of the vapour compression system during nighttime. Thereby it is possible to choose a reference temperature which reflects the prevailing operating conditions, thereby allowing the vapour compression system to be operated in a manner which is optimal under the given circumstances.

BRIEF DESCRIPTION OF THE DRAWINGS

The invention will now be described in further detail with reference to the accompanying drawings, in which.

DETAILED DESCRIPTION

Figure 1:
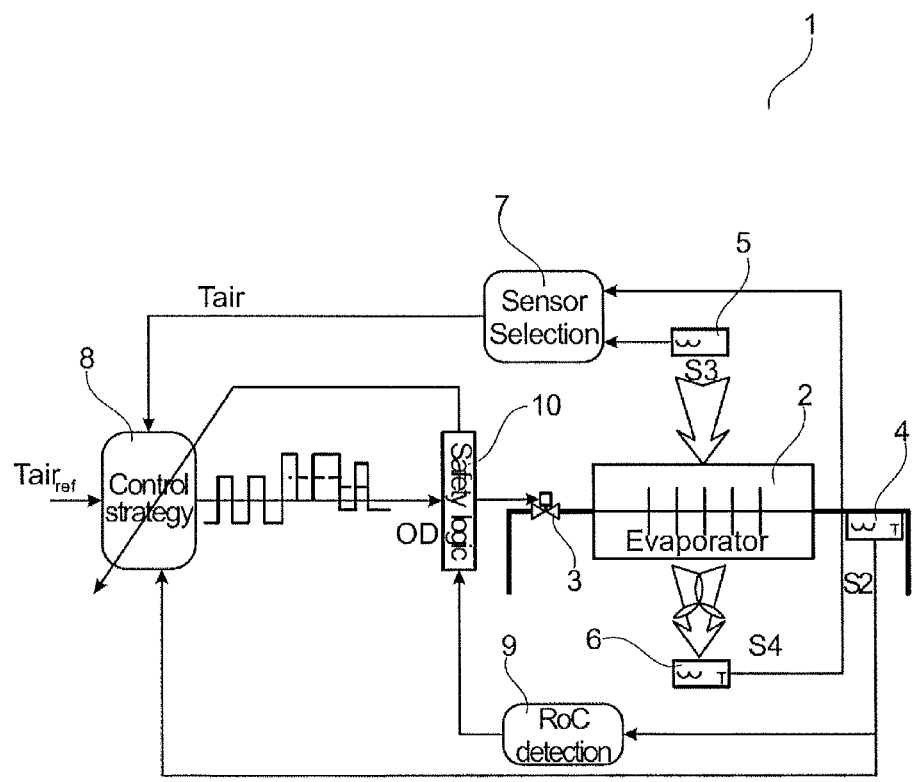
FIG. 1 is a diagrammatic view of a part of a vapour compression system being controlled during normal operation.

FIG. 1 is a diagrammatic view of a part of a vapour compression system 1 being controlled during normal operation. The vapour compression system 1 comprises an evaporator 2 arranged in a refrigerant circuit along with one or more compressors (not shown) and one or more condensers (not shown). An expansion valve 3 is also arranged in the refrigerant circuit for controlling the supply of refrigerant to the evaporator 2.

The vapour compression system 1 further comprises a number of temperature sensors. A first temperature sensor 4 is arranged in the refrigerant circuit after the outlet of the evaporator 2. Accordingly, the first temperature sensor 4 measures a temperature signal, $S_2$, which represents the temperature of refrigerant leaving the evaporator 2.

A second temperature sensor 5 is arranged in a secondary air flow across the evaporator 2, at a position before the air reaches the evaporator 2. Accordingly, the second temperature sensor 5 measures a temperature signal, $S_3$, which represents the temperature of air flowing towards the evaporator 2.

A third temperature sensor 6 is arranged in the secondary air flow across the evaporator 2, at a position after the air has passed the evaporator 2. Accordingly, the third temperature sensor 6 measures a temperature signal, $S_4$, which represents the temperature of air flowing away from the evaporator 2.

The temperature signals, $S_3$ and $S_4$, measured by the second temperature sensor 5 and the third temperature sensor 6, are supplied to a sensor selection unit 7. The sensor selection unit 7 selects whether to apply one of the temperature signals, $S_3$ and $S_4$, when controlling the expansion valve 3, or to apply a weighted value of the two temperature signals, $S_3$ and $S_4$. The selection may, e.g., be based on the availability of the sensors 5 and 6, or on the choice of the installer. Based on the selection, a temperature signal, $T_{air}$, is generated, and $T_{air}$ represents an air temperature, corresponding to the selection performed by the selection unit 7. The temperature signal, $T_{air}$, is supplied to a control unit 8, which is arranged to control an opening degree of the expansion valve 3.

A reference air temperature, $T_{air, ref}$ is also supplied to the control unit 8. The reference air temperature, $T_{air, ref}$ represents a reference or target temperature which is desired in the air flowing across the evaporator 2.

The control unit 8 compares the temperature signal, $T_{air}$, to the reference air temperature, $T_{air, ref}$ and calculates an opening degree of the expansion valve 3, based on this comparison. The opening degree of the expansion valve 3 is selected in such a manner that the opening degree ensures a supply of refrigerant to the evaporator 2, which causes the air temperature, $T_{air}$, to approach the reference air temperature, $T_{air, ref}$. Thus, during normal operation, the control unit 8 controls the opening degree of the expansion valve 3 on the basis of the selected air temperature, $T_{air}$, i.e. using the second 5 and/or third 6 temperature sensor, and in order to reach the reference temperature, $T_{air, ref}$. Accordingly, the normal operation of the vapour compression system 1 depends on reliable temperature measurement signals from the second 5 and/or the third 6 temperature sensor.

The temperature signal, $S_2$, measured by the first temperature sensor 4 is also supplied to the control unit 8. Thereby, the temperature of refrigerant leaving the evaporator 2 may also be taken into account when the opening degree of the expansion valve 3 is calculated by the control unit 8.

When the control unit 8 has calculated an opening degree of the expansion valve 3 as described above, the control unit 8 may apply a perturbation signal to the calculated opening degree. In FIG. 1, the perturbation signal is shown as a relay like perturbation signal. In this case, the resulting signal is supplied to the expansion valve 3, and the opening degree of the expansion valve 3 is controlled to be the calculated opening degree, overlaid with the perturbation signal.

In the case that the opening degree of the expansion valve 3 is controlled on the basis of the calculated opening degree and the overlaid perturbation signal, the temperature signal, $S_2$, measured by the first temperature sensor 4, is also supplied to an analysing unit 9. The analysing unit 9 analyses the temperature signal, $S_2$, e.g. with respect to a rate of change of the temperature signal, $S_2$. The result of the analysis is supplied to a safety logic unit 10. The safety logic unit 10 monitors the result of the analysis, e.g. the rate of change of the temperature signal, $S_2$. In the case that the analysis reveals that a dry zone of the evaporator is approaching a minimum length, the safety logic unit 10 sends a signal to the control unit 8, requesting that the opening degree of the expansion valve 3 is decreased. In response to this signal, the control unit 8 decreases the opening degree of the expansion valve 3. For instance, the safety logic unit 10 may conclude that the dry zone of the evaporator 2 is approaching a minimum length if an absolute value of the rate of change of the temperature signal, $S_2$, reaches a maximum value.

Figure 2:
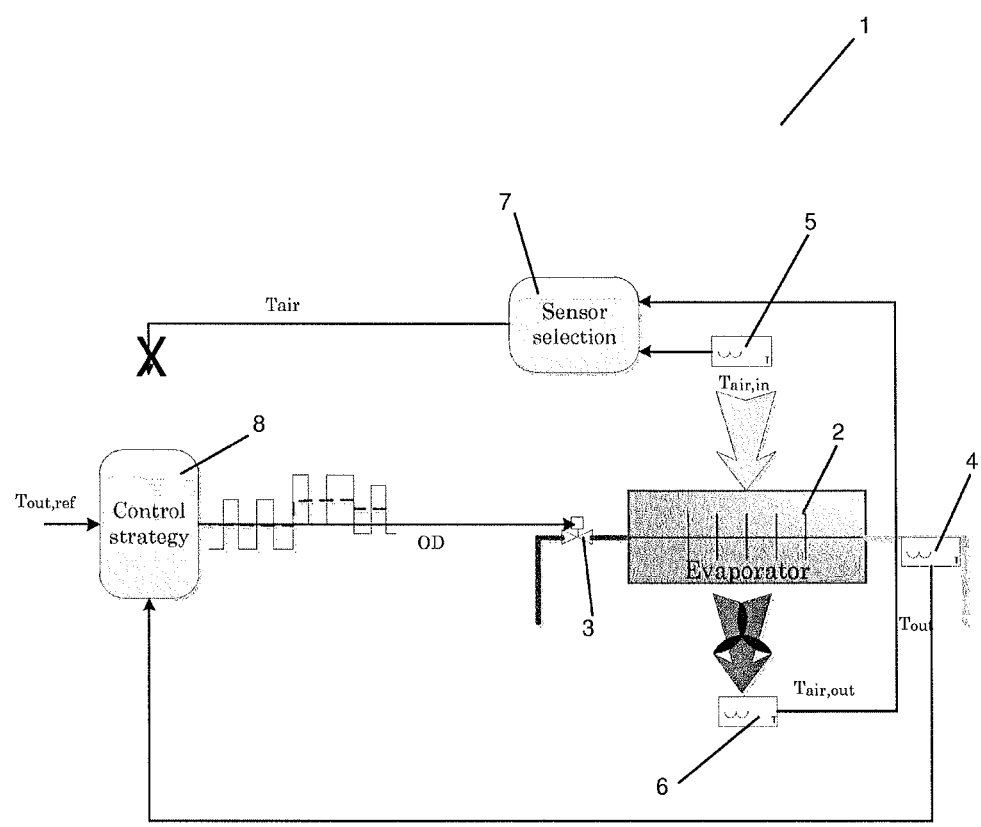
FIG. 2 is a diagrammatic view of a part of a vapour compression system being controlled in a contingency mode, in accordance with an embodiment of the invention.

FIG. 2 is a diagrammatic view of a part of a vapour compression system 1 being controlled in a contingency mode, in accordance with an embodiment of the invention. The vapour compression system 1 of FIG. 2 is very similar to the vapour compression system 1 of FIG. 1, and it will therefore not be described in detail here.

However, in the vapour compression system 1 of FIG. 2, the second temperature sensor 5 and/or the third temperature sensor 6 is/are unavailable or unreliable. Therefore the signal from the sensor selection unit 7 to the control unit 8 is blocked, and the control unit 8 thereby receives no air temperature measurements. Accordingly, the control unit 8 is not able to calculate the opening degree of the expansion valve 3, in the manner described above, and on the basis of the air temperature, $T_{air}$.

In order to allow the vapour compression system 1 to continue operating, despite the unavailable or unreliable temperature sensor(s) 5, 6, a reference temperature, $T_{out, ref}$ is calculated, based on previous measurements of the temperature, $T_{out}$, of refrigerant leaving the evaporator 2, performed by the first temperature sensor 4. The previously obtained values of the temperature, $T_{out}$, were obtained during a predefined previous time interval, e.g. the four hours preceding the point in time where it was detected that the temperature sensor(s) 5, 6 was/were unavailable or unreliable. The calculated reference temperature, $T_{out, ref}$ may, e.g., be an average of the temperature values, $T_{out}$, obtained by the first temperature sensor 4 during the predefined previous time interval.

The calculated reference temperature, $T_{out, ref}$ is supplied to the control unit 8. Furthermore, the temperature, $T_{out}$, of refrigerant leaving the evaporator 2 is still measured by means of the first temperature sensor 4, and the temperature signal, $T_{out}$, is supplied to the control unit 8. The control unit 8 compares the temperature signal, $T_{out}$, to the calculated reference temperature, $T_{out, ref}$ and calculates an opening degree of the expansion valve 3, based on this comparison. The opening degree of the expansion valve 3 is selected in such a manner that the opening degree ensures a supply of refrigerant to the evaporator 2, which cause the temperature, $T_{out}$, of refrigerant leaving the evaporator 2 to approach the reference temperature, $T_{out, ref}$.

In centralised vapour compression systems, where the suction pressure is controlled by a compressor rack controller, it may be assumed that the suction pressure, i.e. the pressure prevailing in the suction line interconnecting the outlet of the evaporator 2 and the inlet of the compressor rack, is substantially constant, at least on a short timescale. During steady state operation of the vapour compression system 1, the superheat, SH, is kept substantially constant. The superheat, SH, is defined as $$SH = T_{out} - T_e,$$

where $T_e$ is the bubble temperature or the dew point of refrigerant leaving the evaporator 2. Accordingly, the superheat, SH, represents the difference between the actual temperature, $T_{out}$, of refrigerant leaving the evaporator 2 and the dew point, $T_e$, of the refrigerant leaving the evaporator 2. It is desirable to control the vapour compression system 1 in such a manner that the superheat, SH, is kept at a small, positive value, because thereby it is ensured that the refrigerant contained in the evaporator 2 is a mixture of gaseous and liquid refrigerant, along a substantial part of the evaporator 2. This ensures that the potential refrigerating capacity of the evaporator 2 is utilised to the greatest possible extent, without risking that liquid refrigerant passes through the evaporator 2 and into the suction line.

The dew point, $T_e$, of the refrigerant leaving the evaporator 2 depends on the pressure of the refrigerant leaving the evaporator 2. Since this pressure can be assumed to be substantially constant when the suction pressure is controlled by the compressor rack controller, as described above, $T_e$ can also be assumed to be substantially constant. Furthermore, since the superheat, SH, is kept substantially constant during steady state operation of the vapour compression system 1, it can be concluded that $T_{out}$ is also substantially constant. Accordingly, maintaining the temperature, $T_{out}$, of refrigerant leaving the evaporator at a level which corresponds to an average level of $T_{out}$ during a predefined time interval, will ensure that the superheat, SH, of refrigerant leaving the evaporator 2 is kept at a suitable level. When the second temperature sensor 5 and/or the third temperature sensor 6 is/are unavailable or unreliable, it is therefore suitable to control the opening degree of the expansion valve 3, and thereby the supply of refrigerant to the evaporator 2, based on the temperature, $T_{out}$, of refrigerant leaving the evaporator 2, and in such a manner that the calculated reference temperature, $T_{out, ref}$ is reached.

Thus, according to the embodiment of the invention illustrated in FIG. 2, the supply of refrigerant to the evaporator 2 is controlled, based on the temperature measurements performed by the first temperature sensor 4, when the second temperature sensor 5 and/or the third temperature sensor 6 is/are unavailable or unreliable. This is an advantage as compared to prior art contingency mode control, because it allows the supply of refrigerant to the evaporator 2 to be controlled in a manner which optimises the efficiency of the vapour compression system, including utilising the potential refrigeration capacity of the evaporator 2 to the greatest possible extent. Furthermore, it allows the system to react on changes in refrigeration load, e.g. in the case that new products are positioned in a display case of the vapour compression system.

The vapour compression system 1 may be operated as described above, i.e. on the basis of the temperature, $T_{out}$, of refrigerant leaving the evaporator 2, until the unavailable or unreliable temperature sensor(s) 5, 6 has/have been replaced or repaired.

Figure 3:
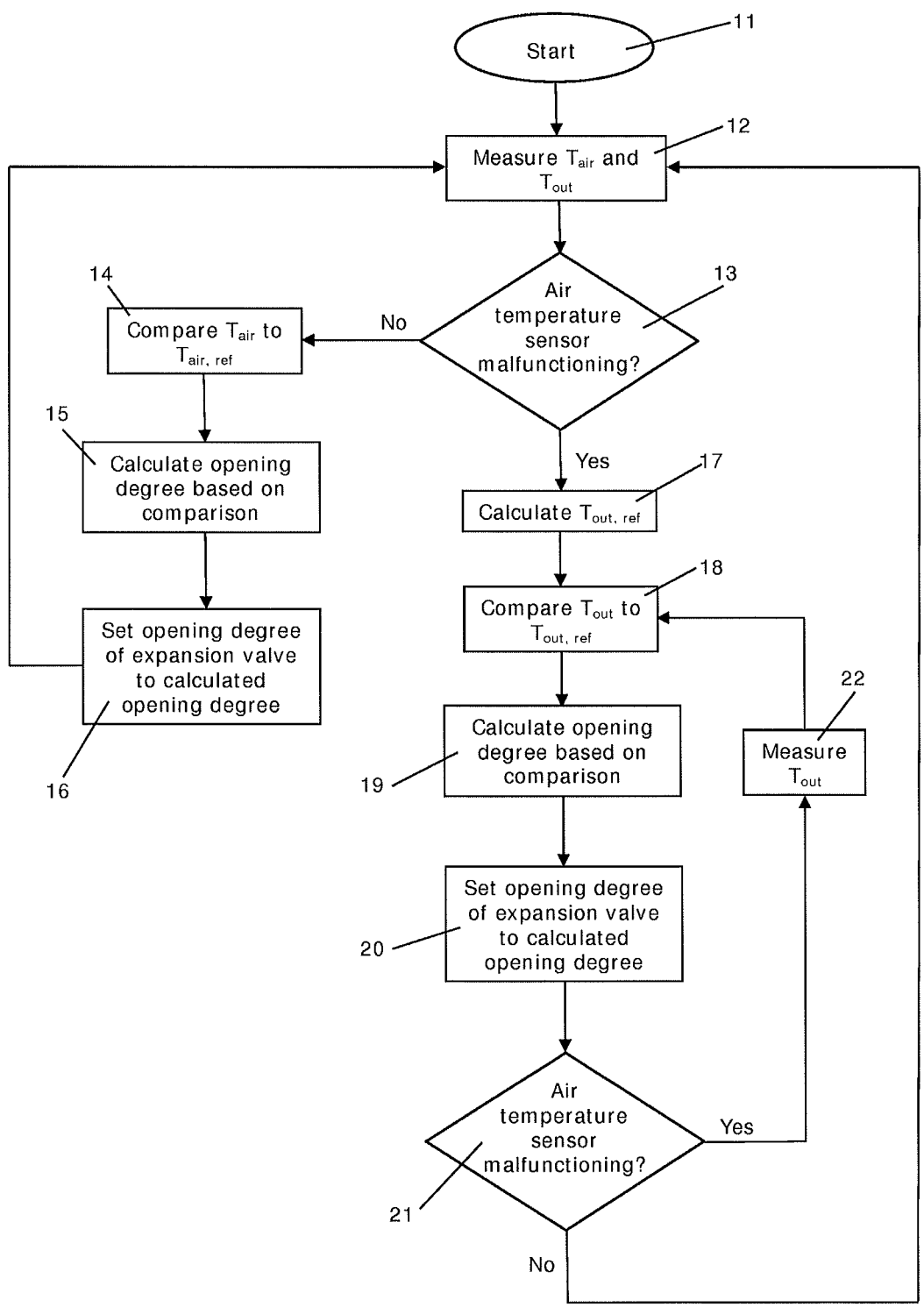
FIG. 3 is a flow chart illustrating a method according to an embodiment of the invention.

FIG. 3 is a flow chart illustrating a method according to an embodiment of the invention. The method illustrated in FIG. 3 may, e.g., be used for controlling the vapour compression system 1 of FIG. 1 or FIG. 2. The process is started at step 11. At step 12, a temperature, $T_{air}$, of air flowing across the evaporator, and a temperature, $T_{out}$, of refrigerant leaving the evaporator are measured.

At step 13 it is investigated whether or not the temperature sensor used for measuring the temperature, $T_{air}$, of air flowing across the evaporator is malfunctioning. If this is not the case, i.e. of the temperature sensor is available an operating reliably, the process is forwarded to step 14.

At step 14 the measured air temperature, $T_{air}$, is compared to a reference air temperature, $T_{air, ref}$. It is further ensured that the evaporator is filled without being flooded. This may, e.g., include monitoring a superheat value of refrigerant leaving the evaporator, or investigating a behaviour of a temperature signal of refrigerant leaving the evaporator. At step 15 an opening degree of the expansion valve is calculated, based on the comparison performed in step 14. The calculation of the opening degree is performed in such a manner that setting the opening degree of the expansion valve to the calculated opening degree will result in the air temperature, $T_{air}$, approaching the reference air temperature, $T_{air, ref}$. The calculation of the opening degree may further be based on a comparison of a measured superheat value and a reference superheat value. At step 16 the opening degree of the expansion valve is set to the calculated opening degree, before the process is returned to step 12 for continued measurements of the air temperature, $T_{air}$, and the temperature, $T_{out}$, of refrigerant leaving the evaporator.

Thus, if step 13 reveals that the air temperature sensor is not malfunctioning, and reliable measurements of the air temperature, $T_{air}$, are therefore available, the opening degree of the expansion valve, and thereby the supply of refrigerant to the evaporator, is controlled on the basis of the measured air temperature, $T_{air}$, and in order to obtain a temperature, $T_{air}$, of air flowing across the evaporator, which is equal to the reference air temperature, $T_{air, ref}$.

On the other hand, if step 13 reveals that the air temperature sensor is malfunctioning, it is not possible to control the opening degree of the expansion valve in the manner described above, since reliable measurements of the air temperature, $T_{air}$, are not available in this case. It is therefore necessary to apply another control strategy, allowing the vapour compression system to continue operating until the malfunctioning sensor has been replaced or repaired.

To this end a reference temperature, $T_{out, ref}$ is calculated at step 17. The reference temperature, $T_{out, ref}$ is calculated on the basis of previously obtained values of the temperature, $T_{out}$, during a predefined previous time interval, such as a 2-4 hours interval immediately preceding the malfunction of the temperature sensor used for measuring the air temperature, $T_{air}$. The reference temperature, $T_{out, ref}$ may, e.g., be calculated as an average of measured values of $T_{out}$ during the predefined time interval. In any event, the reference temperature, $T_{out, ref}$ is calculated based on measurements which are performed during normal operation of the vapour compression system, i.e. while the opening degree of the expansion valve is controlled in the manner described above, based on the measured air temperature, $T_{air}$. Accordingly, the calculated reference temperature, $T_{out, ref}$ represents a typical level of the temperature, $T_{out}$, of refrigerant leaving the evaporator, during normal operation of the vapour compression system.

At step 18 the measured temperature, $T_{out}$, of refrigerant leaving the evaporator is compared to the calculated reference temperature, $T_{out, ref}$ and at step 19 an opening degree of the expansion valve is calculated, based on the comparison performed in step 18. Similarly to the situation described above with reference to step 15, the calculation of the opening degree performed in step 19, is performed in such a manner that setting the opening degree of the expansion valve to the calculated opening degree will result in the temperature, $T_{out}$, of refrigerant leaving the evaporator approaching the reference temperature, $T_{out, ref}$. At step 20 the opening degree of the expansion valve is set to the calculated opening degree.

Thus, if step 13 reveals that the air temperature sensor is in fact malfunctioning, and reliable measurements of the air temperature, $T_{air}$, are therefore unavailable, the opening degree of the expansion valve, and thereby the supply of refrigerant to the evaporator, is controlled on the basis of the measured temperature, $T_{out}$, of refrigerant leaving the evaporator, and in order to obtain a temperature, $T_{out}$, of refrigerant leaving the evaporator, which is equal to the calculated reference temperature, $T_{out, ref}$.

The process is then forwarded to step 21, where it is investigated whether or not the air temperature sensor is still malfunctioning, and thereby whether or not reliable measurements of the air temperature, $T_{air}$, are still unavailable. If this is the case, it is still necessary to control the opening degree of the expansion valve, and thereby the supply of refrigerant to the evaporator, on the basis of measured values of the temperature, $T_{out}$, of refrigerant leaving the evaporator. The process is therefore forwarded to step 22, where the temperature, $T_{out}$, of refrigerant leaving the evaporator is measured. The process is then returned to step 18, where the new measured value of the temperature, $T_{out}$, is compared to the calculated reference temperature, $T_{out, ref}$.

In the case that step 21 reveals that the air temperature sensor is no longer malfunctioning, reliable measurements of the air temperature, $T_{air}$, are once again available, and the opening degree of the expansion valve can therefore once again be controlled according to the normal control strategy. Accordingly, the process is, in this case, returned to step 12 for continued measurements of the air temperature, $T_{air}$, and the temperature, $T_{out}$, of refrigerant leaving the evaporator.

Figure 4:
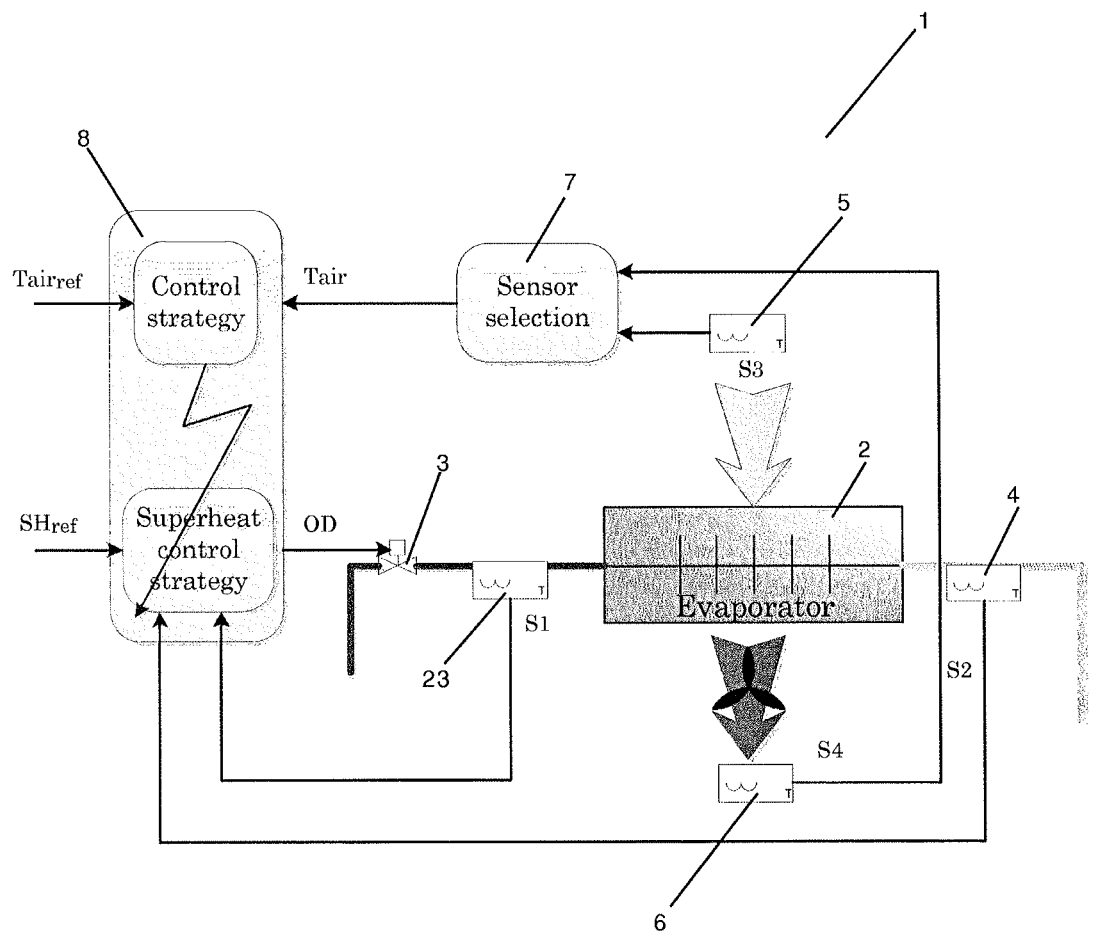
FIGS. 4 and 5 are diagrammatic views of a part of a vapour compression system being controlled in accordance with alternative embodiments of the invention.

FIG. 4 is a diagrammatic view of a part of a vapour compression system 1 being controlled in accordance with an alternative embodiment of the invention. The vapour compression system 1 of FIG. 4 is very similar to the vapour compression systems 1 of FIGS. 1 and 2, and it will therefore not be described in further detail here.

In the vapour compression system 1 of FIG. 4, the opening degree of the expansion valve 3 is controlled on the basis of the air temperature, as well as on the basis of the superheat of refrigerant leaving the evaporator 2. The superheat of the refrigerant leaving the evaporator 2 is obtained by measuring the temperature of refrigerant leaving the evaporator 2, by means of the first temperature sensor 4, and the temperature of refrigerant entering the evaporator 2, by means of a fourth temperature sensor 23.

In the case that the fourth temperature sensor 23 malfunctions, i.e. becomes unavailable and/or unreliable, the superheat control of the opening degree of the expansion valve 3 is no longer possible. Therefore the superheat control is replaced by a contingency control strategy identical to the one described above with reference to FIG. 2.

Figure 5:
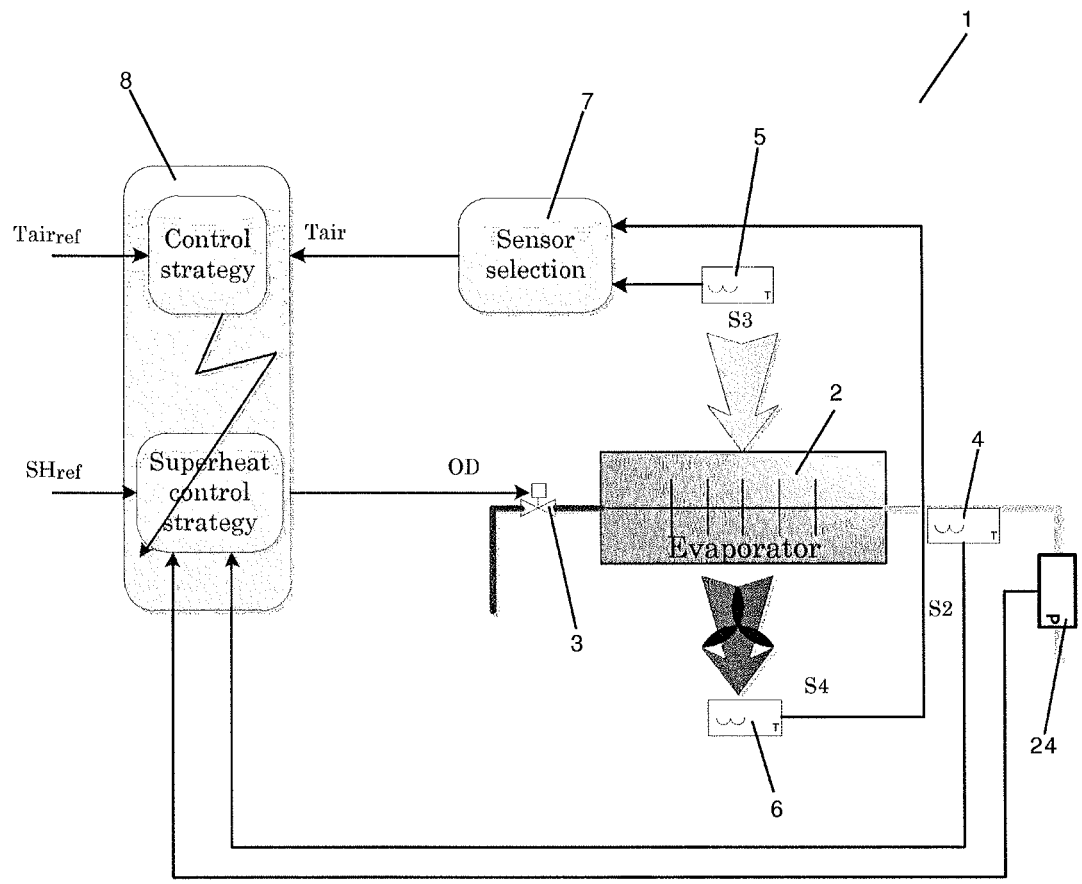

FIG. 5 is a diagrammatic view of a part of a vapour compression system 1 being controlled in accordance with another alternative embodiment of the invention. The vapour compression system 1 of FIG. 5 is very similar to the vapour compression systems 1 of FIGS. 1, 2 and 4, and it will therefore not be described in detail here.

In the vapour compression system 1 of FIG. 5, the opening degree of the expansion valve 3 is also controlled on the basis of the air temperature, as well as on the basis of the superheat of refrigerant leaving the evaporator 2, similar to the embodiment described above with reference to FIG. 4. However, in the vapour compression system 1 of FIG. 5, the superheat of refrigerant is obtained by measuring the temperature of refrigerant leaving the evaporator 2, by means of the first temperature sensor 4, and the pressure of refrigerant leaving the evaporator 2, by means of a pressure sensor 24.

In the case that the pressure sensor 24 malfunctions, i.e. becomes unavailable and/or unreliable, the superheat control of the opening degree of the expansion valve 3 is no longer possible. Therefore the superheat control is replaced by a contingency control strategy identical to the one described above with reference to FIG. 2.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a supply of refrigerant to an evaporator of a vapour compression system, the vapour compression system comprising at least one evaporator, at least one compressor, at least one condenser and at least one expansion valve arranged in a refrigerant circuit, the method comprising the steps of:
   obtaining a temperature, $T_{out}$, of refrigerant leaving the evaporator,
   obtaining, by at least one sensor, a control parameter value relating to the vapour compression system,
   controlling an opening degree of the expansion valve, on the basis of the obtained control parameter, and in order to reach a reference value for the control parameter,
   detecting that the at least one sensor used for obtaining the control parameter is malfunctioning,
   calculating a reference temperature, $T_{out, ref}$, based on previously obtained values of the temperature, $T_{out}$, during a predefined previous time interval, and
   subsequently controlling the opening degree of the expansion valve, on the basis of the obtained temperature, $T_{out}$, and in order to reach the calculated reference temperature, $T_{out, ref}$, of the refrigerant leaving the evaporator.

2. The method according to claim 1, wherein the step of controlling a control parameter value comprises obtaining a temperature, $T_{air}$, of air flowing across the evaporator; the step of controlling an opening degree comprises controlling the opening degree of the expansion valve, on the basis of the obtained air temperature, $T_{air}$, and in order to reach a reference air temperature, $T_{air, ref}$, of the air flowing across the evaporator; and the step of detecting that at least one sensor is malfunctioning comprises detecting that at least one sensor used for obtaining the air temperature, $T_{air}$, is malfunctioning.

3. The method according to claim 1, wherein the step of calculating a reference temperature, $T_{out, ref}$, comprises calculating an average value of obtained values of the temperature, $T_{out}$, of refrigerant leaving the evaporator during the predefined previous time interval.

4. The method according to claim 1, wherein the step of subsequently controlling the opening degree of the expansion valve comprises the steps of:
   providing a perturbation signal, and setting the opening degree of the expansion valve to the controlled opening degree, overlaid with the perturbation signal,
   monitoring the temperature, $T_{out}$, of refrigerant leaving the evaporator, analysing a signal representing the monitored temperature, $T_{out}$, and increasing the opening degree of the expansion valve in the case that said analysis reveals that $T_{out} > T_{out, ref}$.

5. The method according to claim 1, wherein the step of controlling the opening degree of the expansion valve, on the basis of the obtained temperature, $T_{out}$, and in order to reach the calculated reference temperature, $T_{out, ref}$ of the refrigerant leaving the evaporator is continued until the malfunctioning sensor(s) has/have been replaced or repaired.

6. The method according to claim 1, wherein the step of calculating a reference temperature, $T_{out, ref}$ comprises calculating a first reference temperature, $T_{out, ref, day}$, based on values of $T_{out}$ obtained during daytime, and calculating a second reference temperature, $T_{out, ref, night}$, based on values of $T_{out}$ obtained during nighttime.

7. The method according to claim 2, wherein the step of calculating a reference temperature, $T_{out, ref}$ comprises calculating an average value of obtained values of the temperature, $T_{out}$, of refrigerant leaving the evaporator during the predefined previous time interval.

8. The method according to claim 2, wherein the step of subsequently controlling the opening degree of the expansion valve comprises the steps of:

providing a perturbation signal, and setting the opening degree of the expansion valve to the controlled opening degree, overlaid with the perturbation signal, monitoring the temperature, $T_{out}$, of refrigerant leaving the evaporator, analysing a signal representing the monitored temperature, $T_{out}$, and increasing the opening degree of the expansion valve in the case that said analysis reveals that $T_{out} > T_{out, ref}$.

9. The method according to claim 3, wherein the step of subsequently controlling the opening degree of the expansion valve comprises the steps of:

providing a perturbation signal, and setting the opening degree of the expansion valve to the controlled opening degree, overlaid with the perturbation signal, monitoring the temperature, $T_{out}$, of refrigerant leaving the evaporator, analysing a signal representing the monitored temperature, $T_{out}$, and increasing the opening degree of the expansion valve in the case that said analysis reveals that $T_{out} > T_{out, ref}$.

10. The method according to claim 2, wherein the step of controlling the opening degree of the expansion valve, on the basis of the obtained temperature, $T_{out}$, and in order to reach the calculated reference temperature, $T_{out, ref}$ of the refrigerant leaving the evaporator is continued until the malfunctioning sensor(s) has/have been replaced or repaired.

11. The method according to claim 3, wherein the step of controlling the opening degree of the expansion valve, on the basis of the obtained temperature, $T_{out}$, and in order to reach the calculated reference temperature, $T_{out, ref}$ of the refrigerant leaving the evaporator is continued until the malfunctioning sensor(s) has/have been replaced or repaired.

12. The method according to claim 4, wherein the step of controlling the opening degree of the expansion valve, on the basis of the obtained temperature, $T_{out}$, and in order to reach the calculated reference temperature, $T_{out, ref}$ of the refrigerant leaving the evaporator is continued until the malfunctioning sensor(s) has/have been replaced or repaired.

13. The method according to claim 2, wherein the step of calculating a reference temperature, $T_{out, ref}$ comprises calculating a first reference temperature, $T_{out, ref, day}$, based on values of $T_{out}$ obtained during daytime, and calculating a second reference temperature, $T_{out, ref, night}$, based on values of $T_{out}$ obtained during nighttime.

14. The method according to claim 3, wherein the step of calculating a reference temperature, $T_{out, ref}$ comprises calculating a first reference temperature, $T_{out, ref, day}$, based on values of $T_{out}$ obtained during daytime, and calculating a second reference temperature, $T_{out, ref, night}$, based on values of $T_{out}$ obtained during nighttime.

15. The method according to claim 4, wherein the step of calculating a reference temperature, $T_{out, ref}$ comprises calculating a first reference temperature, $T_{out, ref, day}$, based on values of $T_{out}$ obtained during daytime, and calculating a second reference temperature, $T_{out, ref, night}$, based on values of $T_{out}$ obtained during nighttime.

16. The method according to claim 5, wherein the step of calculating a reference temperature, $T_{out, ref}$ comprises calculating a first reference temperature, $T_{out, ref, day}$, based on values of $T_{out}$ obtained during daytime, and calculating a second reference temperature, $T_{out, ref, night}$, based on values of $T_{out}$ obtained during nighttime.

* * * * *